US007736713B2

(12) United States Patent
Uptergrove

(10) Patent No.: US 7,736,713 B2
(45) Date of Patent: Jun. 15, 2010

(54) PRINTING PLASTIC CONTAINERS WITH DIGITAL IMAGES

(75) Inventor: Ronald L. Uptergrove, Canton, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 743 days.

(21) Appl. No.: 11/446,792

(22) Filed: Jun. 5, 2006

(65) Prior Publication Data

US 2006/0213379 A1 Sep. 28, 2006

Related U.S. Application Data

(62) Division of application No. 11/219,411, filed on Sep. 2, 2005, now Pat. No. 7,210,408.

(60) Provisional application No. 60/640,605, filed on Dec. 30, 2004.

(51) Int. Cl.

| | |
|---|---|
| ***B29D 22/00*** | (2006.01) |
| ***B41C 1/12*** | (2006.01) |
| ***B65D 85/00*** | (2006.01) |
| ***B41F 17/00*** | (2006.01) |

(52) U.S. Cl. .................. 428/35.7; 206/459.5; 264/132; 101/35

(58) Field of Classification Search ................ 428/35.7, 428/36.9, 195.1; 156/244.6, 277; 264/132, 264/459.5, 509, 523, 537; 101/35
See application file for complete search history.

(56) References Cited

U.S. PATENT DOCUMENTS

| | | | | |
|---|---|---|---|---|
| 3,417,175 | A | 12/1968 | Brown et al. | |
| 3,490,363 | A | 1/1970 | Derrickson | |
| 5,011,862 | A | 4/1991 | Melber et al. | |
| 5,753,325 | A | 5/1998 | McDaniel et al. | |
| 6,082,563 | A | 7/2000 | Kohn et al. | |
| 6,135,654 | A * | 10/2000 | Jennel | 400/61 |
| 6,513,435 | B2 | 2/2003 | Detzner | |
| 6,706,342 | B2 | 3/2004 | Kong et al. | |
| 6,769,357 | B1 | 8/2004 | Finan | |
| 7,579,388 | B2 | 8/2009 | Kiefer | |
| 2002/0097280 | A1 | 7/2002 | Loper et al. | |
| 2006/0250464 | A1 | 11/2006 | Sheinman | |

FOREIGN PATENT DOCUMENTS

| | | | |
|---|---|---|---|
| WO | WO 03/002349 | * | 1/2003 |
| WO | 2004043702 | A1 | 5/2004 |

* cited by examiner

*Primary Examiner*—Rena L Dye
*Assistant Examiner*—Erik Kashnikow
(74) *Attorney, Agent, or Firm*—Dykema Gossett PLLC

(57) ABSTRACT

A method for printing digital images on plastic containers having curved surfaces, including providing a series of hollow plastic containers, moving the containers along a track past first and second digital printing locations, and printing first and second digital images on the curved container surfaces while maintaining the container being printed under internal pressure and while firmly holding the container being printed at spaced locations thereon.

13 Claims, 3 Drawing Sheets

PRINTING PLASTIC CONTAINERS WITH DIGITAL IMAGES

CROSS-REFERENCE TO RELATED APPLICATION

This application is a division of U.S. patent application Ser. No. 11/219,411, filed Sep. 2, 2005, now U.S. Pat. No. 7,210, 408 which in turn is based on U.S. Provisional application Ser. No. 60/640,605, filed Dec. 30, 2004.

BACKGROUND OF THE INVENTION

The present invention relates to plastic containers having digital images printed thereon, particularly curved plastic containers.

Conventional techniques for printing onto curved plastic containers are subject to significant drawbacks. For example, it is difficult to obtain proper registration between colors, and changing images, designs or wording is expensive and time consuming.

Inkjet printing with multiple nozzles is useful for flat surfaces. However, it is difficult to satisfactorily use multiple nozzles on curved surfaces.

It would be highly desirable to print a digitally generated image directly onto a plastic container, particularly a curved plastic container, wherein the printing can be done at a reasonable speed and at a reasonable cost.

SUMMARY OF THE INVENTION

The present invention provides for printing digital images or indicia directly onto a plastic container, particularly a curved, plastic container, and accomplishing this in a continuous operation at a reasonable speed and at a reasonable cost. Full color digital graphic images or indicia may be directly printed onto containers at multiple areas thereon.

In accordance with the present invention a series of plastic containers are firmly held and moved to and from a first digital printing location and a first digital image is printed thereon at the first printing location on a first printing area on the containers, with the containers held at the top thereof and at a second position spaced from the top thereof, preferably at the base. Desirably, the containers are moved from the first digital printing location to a second digital printing location and a second digital image printed thereon on a second printing area on the containers spaced from the first printing area, with the containers held at the top thereof and at a second area spaced from the top, preferably at the base. The containers are preferably maintained under internal pressure while the digital image or images are printed thereon.

The steps of digitally printing the digital image directly onto the plastic container prints the digital images directly onto a preformed container, for example onto an injection molded or blow molded container, such as polyethylene terephthalate (PET) or high density polyethylene (HDPE). The digital printing operation may print the digital image directly onto the plastic container as by jetting ink through an inkjet print head and onto the container surface. The ink may be a UV-reactive ink, in which case after printing the ink may be cured by exposure to UV light. One may also, for example, treat the container surface to be printed prior to the printing operation, as by flame treatment, corona treatment or plasma jet treatment.

Further features of the present invention will be discussed hereinbelow.

BRIEF DESCRIPTION OF THE DRAWINGS

The present invention will be more readily understandable from a consideration of the following illustrative drawings, wherein.

DETAILED DESCRIPTION OF PREFERRED EMBODIMENTS

Figure 1:
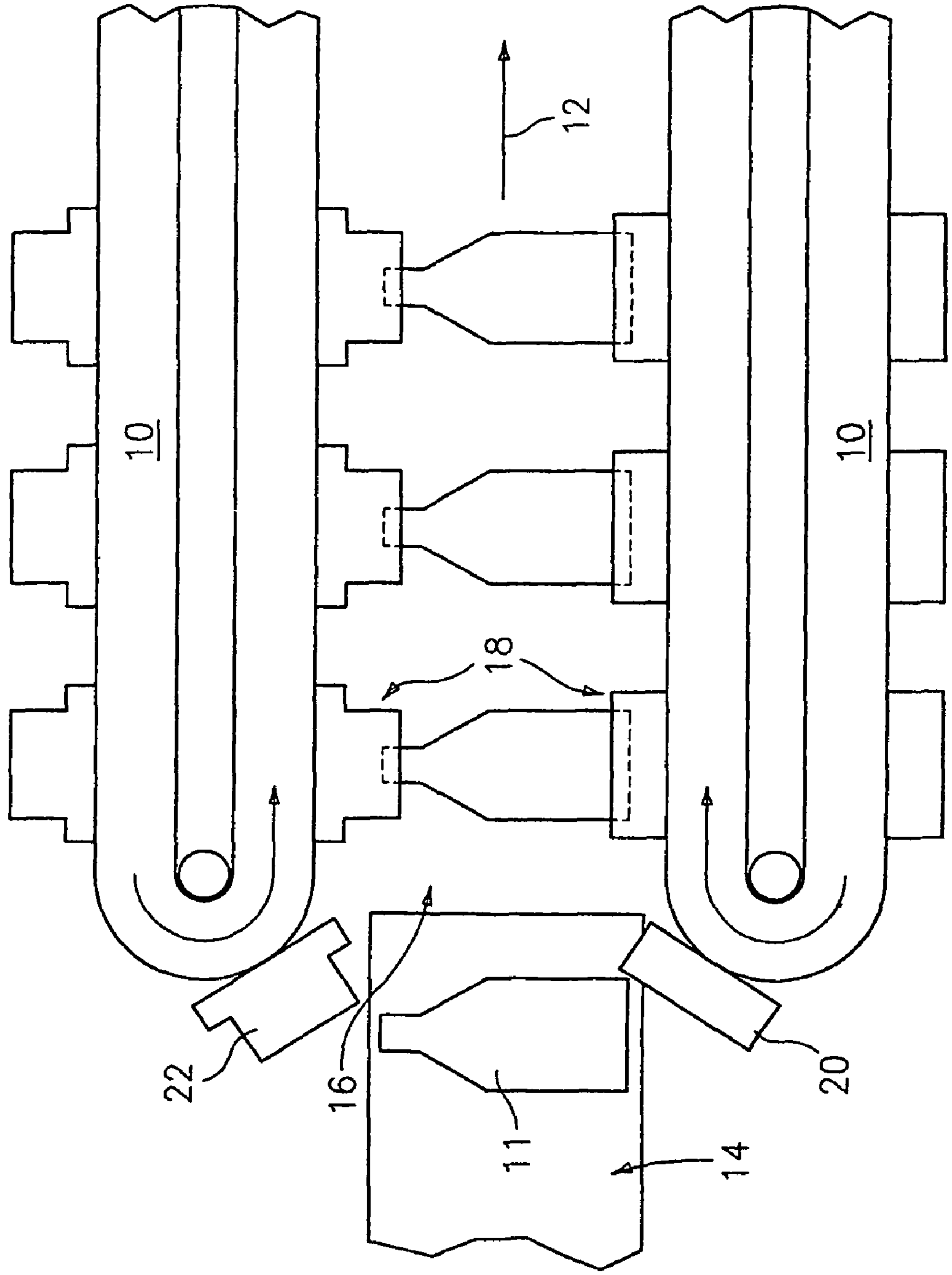
FIG. 1 is a top view of the container conveyer with containers.
Figure 2:
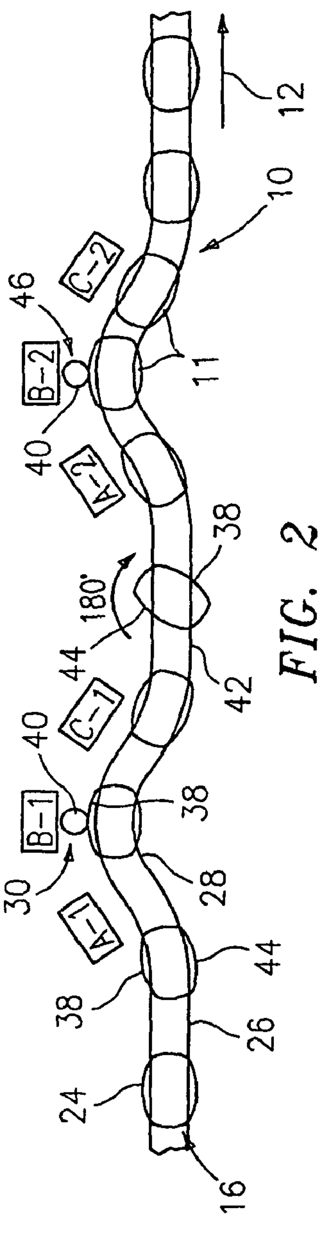
FIG. 2 is a side view of one embodiment of the container flow and treatment.
Figure 3:
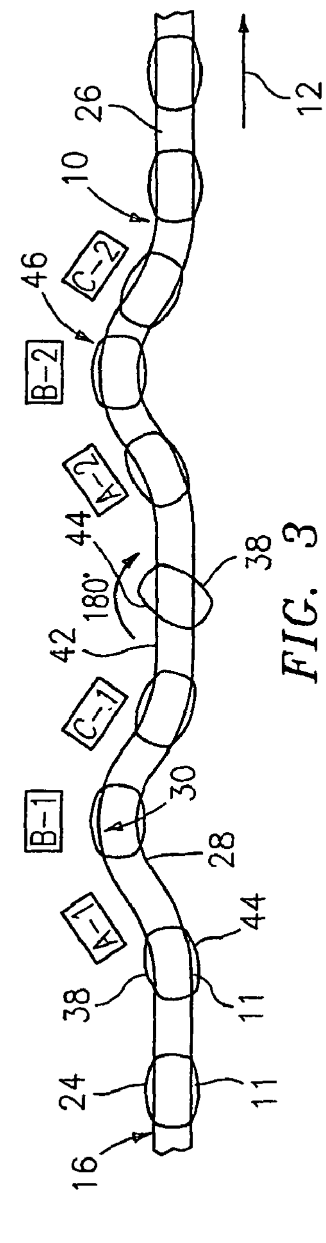
FIG. 3 is a side view of an alternate embodiment of the container flow and treatment.
Figure 4:
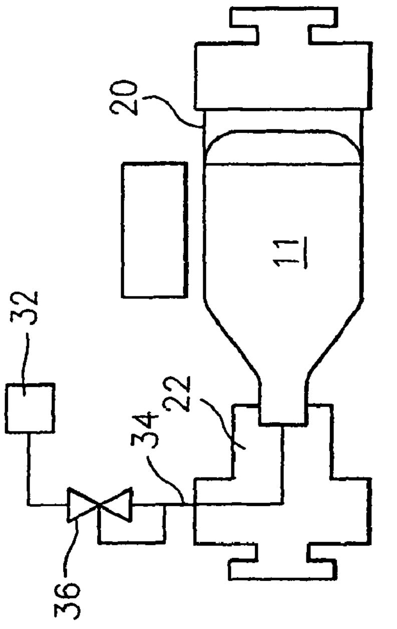
FIG. 4 is a side view of the container clamp assembly.

As can be seen from FIGS. 1-3, a conveyer assembly 10 is provided to move the containers 11 through the treatment procedure in the direction of flow 12. The containers 11 enter the conveyer assembly from infeed conveyer 14 at container entry 16 and are secured in container clamp assembly 18. The clamp assembly secures the containers 11 at two spaced areas, as shown in FIGS. 1 and 4, by container base holder 20 and container top holder 22. It is preferred to hold the container at the top and bottom, although one could employ a top holder plus a second holder spaced therefrom, as on the sidewall. This prevents the containers from moving in any direction except for the direction of container flow 12. The base holder 20 and top holder 22 are synchronized to maintain the same velocity and relationship to each other at all times. Naturally, a commercial operation may have more than one conveyer assembly line.

As can be seen, particularly in FIGS. 2 and 3, the containers 11 are curved, as for example, round or oval, and have a container radius or curved portion 24. The container track 26 also contains a radius of the curved portion 28 at the first printing site 30 which should substantially equal the container radius 24 to be printed in order to facilitate the digital printing operation.

Upon clamping container 11 at the container entry 16 internal pressure is applied to the inside of the container via air pressure means 32 and pressure line 34 (FIG. 4) through the clamp assembly 18, as for example, through top holder 22. Preferably, a pressure regulator 36 is provided to regulate the air pressure, as for example, from 0.125-10.0 psi. This internal pressure will be maintained throughout the treatment procedure and provides a consistent distance of the container surface from the inkjet head and/or a consistent contact pressure for the container surface to the ink roller if the indirect inkjet method is used.

As the containers enter the track curved portion or radius 28 they first pass through a first pre-treatment location A-1, see FIGS. 2 and 3. The pre-treatment location will serve to raise the surface energy of the container on the first container surface 38 to insure ink adhesion thereon, as for example, a heat treatment or corona treatment.

The containers will then pass the first printing site 30, area B-1 in FIGS. 2 and 3. The containers will then have the first printing applied on the first container surface 38 at printing site 30, which may be a direct drop on demand inkjet head as shown in FIG. 3, or an indirect drop on demand inkjet pad 40 as shown in FIG. 2. U.V. ink will be applied directly to the first surface 38 of the containers in one pass. The inkjet may apply multicolor graphics of high quality as desired.

The printed containers will then pass through a first curing station C-1, which will cure the ink or inks applied at the first printing site 30. This may be an ultra violet light source or other radiant curing method.

The containers 11 then enter a straight section 42 of container track 26 where they are rotated, as for example, 180°, to expose second surface 44 of the containers to the second printing site 46, as by the clamp assembly 18 or other rotating means. The second container surface 44 is spaced from the first container surface 38, desirably an area opposed to the first container surface, as 180° therefrom.

After rotation the containers 11 with container first surface 38 having printing thereon are moved through a second pre-treatment area A-2 where the surface energy of the container on the container second surface 44 is raised as at the first pre-treatment area A-1. The containers will then pass the second printing site 46, area B2, wherein the second printing will be performed on the second surface 44 of the containers. Similar to first printing site 30, printing at the second printing site may be a direct drop on demand inkjet head as shown in FIG. 3 or an indirect drop on demand inkjet pad 40 as shown in FIG. 2. Also, at the second printing site 46 U.V. ink will be applied directly to the second surface 44 of the containers in one pass, as multicolor graphics of high quality, as desired.

The printed containers will then pass through a second curing station C-2 which will cure the ink or inks applied at the second printing site. Here again, this may be an ultra violet light source other radiant curing method.

The container clamp assembly 18 will then release the containers, printed on two sides or two locations and pass them on to an out-feed conveyer or storage and return to repeat the cycle.

In the printing procedure it is desirable to maintain a plurality of print heads at a constant distance and perpendicularity from the non-planar container surface during the printing process. A plurality of print heads may be desirably articulated during the printing process to maintain a constant distance and perpendicularity from the non-planar container surface. A plurality of sensors may be used to measure the curvature of the non-planar surface and to control the articulation of the plurality of print heads to maintain the constant distance and perpendicularity from the non-planar surface. The print heads and/or container are desirably moved at a constant velocity relative to the non-planar surface during the printing process. Also real time control is preferably provided to the printing control system to determine the relative position of the non-planar surface to the printing process. The foregoing features provide improved digital printing on the curved container surface.

Figure 5:
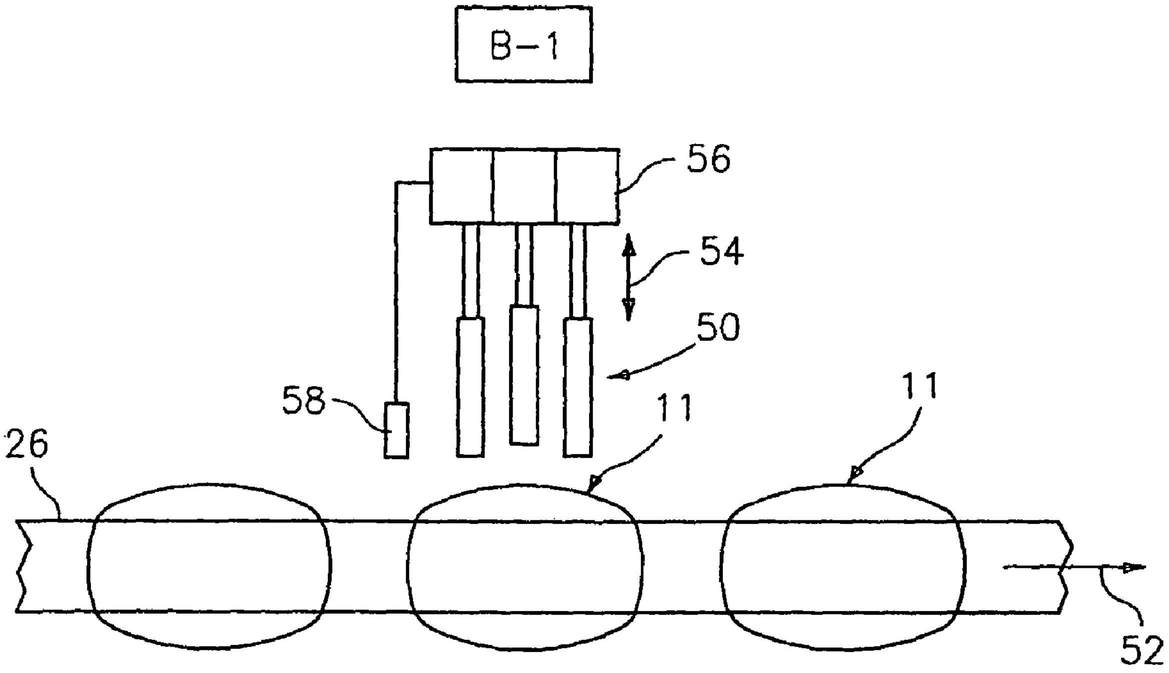
FIG. 5 is an enlarged side view of an alternate embodiment of the container flow and treatment.

Thus, for example, as shown in FIG. 5 which shows an enlarged view of the first printing site 30, area B-1, the conveyer system or container track 26 can be straight. The containers 11 with their container radius or curved portions 24 pass under print heads 50 which are each separately movable up and down perpendicular to the direction of the container flow 52 in the direction of print head movement 54 by suitable motive means as articulation device 56. A constant distance or spacing between the container surface to be printed and the print heads is therefore maintained by the use of measuring device or sensor 58, such as a laser sensor, which determines the location of the surface to be printed and provides electronic feedback to the articulation device 56 for appropriately moving the print heads. Thus, as the containers pass under the print heads each head may move up and down as desired independent of each other and coordinated to the desired printing location. Subsequent processing will proceed in a manner after that shown in FIGS. 2 and 3 with a straight container track, desirably rotating the container, and printing at the second printing side.

Thus, the present invention provides an improved procedure for printing digital images or indicia directly onto a curved plastic container. The procedure is continuous and efficient and enables two sides or two areas to be efficiently printed.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A plastic container having curved surfaces with digital images thereon, which comprises:

a hollow plastic container having curved external surfaces, said container having a first multiple color, single-cured digital image on a first curved surface having a non-constant radius of curvature, and a second multiple color, single-cured digital image on a second curved surface having a non-constant radius of curvature, wherein said second curved surface is spaced from said first curved surface, and wherein said first and second curved surfaces are on opposed surfaces;

wherein said digital images are printed with a plurality of independently movable print heads.

2. A container according to claim 1, wherein said container is oval.

3. A container according to claim 1, wherein said container is one of an injection molded plastic container and a blow molded plastic container.

4. A container according to claim 3, wherein said container is one of polyethylene terephthalate and high density polyethylene.

5. A container according to claim 1, wherein said digital images are inkjet printed digital images.

6. A container according to claim 1, wherein said digital images are printed on said container at different times.

7. A container according to claim 1, wherein said digitally printed surfaces include UV-reactive ink.

8. A container according to claim 1, wherein said digitally printed surface is the final coating.

9. A container according to claim 5, wherein said container is pre-treated to raise the surface energy prior to digital printing.

10. A container according to claim 5, wherein the inkjet printing is a drop on demand printing.

11. A container according to claim 5, wherein the inkjet printed image is a UV reactive ink and is cured by UV light.

12. A container according to claim 1, wherein said container is configured to hold an internal pressure of from 0.125 to 10.0 psi.

13. A container according to claim 1, wherein each image is printed in one pass.

* * * * *